(12) United States Patent
Uneura et al.

(10) Patent No.: US 10,677,287 B2
(45) Date of Patent: Jun. 9, 2020

(54) BEARING STRUCTURE AND TURBOCHARGER

(71) Applicant: IHI Corporation, Koto-ku (JP)

(72) Inventors: Yutaka Uneura, Tokyo (JP); Shinichi Kaneda, Tokyo (JP); Shunsuke Nishii, Tokyo (JP); Hideyuki Kojima, Tokyo (JP); Tomomi Sugiura, Tokyo (JP); Kenji Bunno, Tokyo (JP)

(73) Assignee: IHI Corporation, Koto-ku (JP)

( * ) Notice: Subject to any disclaimer, the term of this patent is extended or adjusted under 35 U.S.C. 154(b) by 148 days.

(21) Appl. No.: 15/955,833

(22) Filed: Apr. 18, 2018

(65) Prior Publication Data

US 2018/0231053 A1    Aug. 16, 2018

Related U.S. Application Data

(63) Continuation of application No. PCT/JP2016/080243, filed on Oct. 12, 2016.

(30) Foreign Application Priority Data

Oct. 21, 2015    (JP) .................................. 2015-207359

(51) Int. Cl.
*F16C 17/10*    (2006.01)
*F16C 27/02*    (2006.01)
(Continued)

(52) U.S. Cl.
CPC .......... *F16C 17/102* (2013.01); *F02B 39/005* (2013.01); *F02B 39/14* (2013.01);
(Continued)

(58) Field of Classification Search
CPC .................................................. F16C 17/102
See application file for complete search history.

(56) References Cited

U.S. PATENT DOCUMENTS

| 6,017,184 A * | 1/2000 | Aguilar ................... F01D 25/16 |
| | | 415/112 |
| 7,670,056 B2 * | 3/2010 | Petitjean ................. F01D 25/16 |
| | | 384/284 |

(Continued)

FOREIGN PATENT DOCUMENTS

| CN | 101473124 A | 7/2009 |
| CN | 102678201 A | 9/2012 |

(Continued)

OTHER PUBLICATIONS

Combined Office Action and Search Report dated Feb. 26, 2019 in Chinese Patent Application No. 201680060818.X, citing documents AO-AQ therein, 11 pages (with English translation of the Office Action and English translation of categories of cited documents).

(Continued)

*Primary Examiner* — Igor Kershteyn
*Assistant Examiner* — Jason G Davis
(74) *Attorney, Agent, or Firm* — Oblon, McClelland, Maier & Neustadt, L.L.P.

(57) ABSTRACT

A bearing structure S includes: a bearing hole formed in a housing; a main body portion of a bearing provided in the bearing hole and inserted with a shaft therethrough; damper surface and provided on an outer circumferential surface of the main body portion, the damper surface facing an inner circumferential surface of the bearing hole; thrust surface provided at end portions of the main body portion in an axial direction of the shaft; and thrust back surface portions provided in the main body portion and having an outer diameter larger than those of the damper surface, the thrust back surface portions spaced apart from the damper surface by a distance farther than a distance between each of the damper surface and the inner circumferential surface of the (Continued)

bearing hole and positioned on back sides of the thrust surface.

7 Claims, 6 Drawing Sheets

(51) Int. Cl.
    *F04D 29/057* (2006.01)
    *F04D 29/047* (2006.01)
    *F16C 37/00* (2006.01)
    *F02B 39/00* (2006.01)
    *F04D 29/041* (2006.01)
    *F04D 29/051* (2006.01)
    *F02B 39/14* (2006.01)

(52) U.S. Cl.
    CPC ..... *F04D 29/0413* (2013.01); *F04D 29/0473* (2013.01); *F04D 29/057* (2013.01); *F04D 29/0513* (2013.01); *F16C 17/10* (2013.01); *F16C 27/02* (2013.01); *F16C 37/00* (2013.01); *F16C 37/007* (2013.01); *F16C 2360/24* (2013.01)

(56) References Cited

U.S. PATENT DOCUMENTS 8,628,247 B2 * 1/2014 Uesugi ................. F01D 25/166
                                                                        384/397
9,470,240 B2 * 10/2016 Uneura ................. F04D 29/057
9,903,226 B2 * 2/2018 Uneura ................. F01D 25/186

FOREIGN PATENT DOCUMENTS

| CN | 103492733 A | 1/2014 |
|---|---|---|
| EP | 1 972 759 A2 | 9/2008 |
| JP | 58-152527 U | 10/1983 |
| JP | 5-65829 | 3/1993 |
| JP | 9-242554 | 9/1997 |
| JP | 2005-133635 | 5/2005 |
| JP | 2010-138757 | 6/2010 |
| JP | 2014-9701 | 1/2014 |
| JP | 2014-15854 | 1/2014 |
| JP | 2014-43804 | 3/2014 |
| JP | 2015-48756 | 3/2015 |

OTHER PUBLICATIONS

International Preliminary Report on Patentability and Written Opinion dated May 3, 2018 in PCT/JP2016/080243.

International Search Report dated Dec. 20, 2016 in PCT/JP2016/080243 filed Oct. 12, 2016 (with English Translation).

Office Action dated Dec. 11, 2018 in Japanese Patent Application No. 2017-546512 (with English translation).

* cited by examiner

BEARING STRUCTURE AND TURBOCHARGER

CROSS REFERENCE TO RELATED APPLICATIONS

This application is a continuation application of International Application No. PCT/JP2016/080243, filed on Oct. 12, 2016, which claims priority to Japanese Patent Application No. 2015-207359, filed on Oct. 21, 2015, the entire contents of which are incorporated by reference herein.

BACKGROUND ART

Technical Field

The present disclosure relates to a bearing structure pivotally supporting a shaft and a turbocharger.

Related Art

In the related art, turbochargers in which a shaft pivotally supported in a freely rotatable manner is accommodated in a housing are known. One end of the shaft is provided with a turbine impeller. The other end of the shaft is provided with a compressor impeller. Such a turbocharger is connected to an engine. The turbine impeller rotates by exhaust gas discharged from the engine. The rotation of the turbine impeller causes the compressor impeller to rotate via the shaft. In this manner, the turbocharger compresses the air in accordance with the rotation of the compressor impeller and delivers the air to the engine.

In a turbocharger described in Patent Literature 1, an annular semi-floating bearing is accommodated in a bearing hole formed in a housing. The semi-floating bearing is inserted with a shaft and pivotally supports the shaft. In the semi-floating bearing, a thrust surface is formed at both end portions in an axial direction of the shaft. The thrust surfaces receive a thrust load.

CITATION LIST

Patent Literature

Patent Literature 1: Japanese Patent Application Laid-Open No. 2010-138757

SUMMARY

Technical Problem

In recent years, a higher rotation speed of a shaft has been demanded. As the rotation speed of a shaft increases, a thrust surface tends to have a higher temperature. Therefore, in semi-floating bearings in which a thrust surface is formed at end portions as described above, development of a technique for improving cooling performance of the thrust surface is desired.

An object of the present disclosure is to provide a bearing structure capable of improving cooling performance of a thrust surface formed at an end portion of a semi-floating bearing and a turbocharger.

Solution to Problem

In order to solve the above problem, a bearing structure according to one aspect of the present disclosure includes: a bearing hole formed in a housing; a main body portion of a bearing provided in the bearing hole and inserted with a shaft therethrough; a damper surface provided on an outer circumferential surface of the main body portion, the damper surface facing an inner circumferential surface of the bearing hole; a thrust surface provided at an end portion of the main body in an axial direction of the shaft; and a thrust back surface portion provided in the main body portion and having an outer diameter larger than that of the damper surface, the thrust back surface portion spaced apart from the damper surface by a distance farther than a distance between the damper surface and the inner circumferential surface of the bearing hole and positioned on a back side of the thrust surface.

The main body portion may include an extending portion extending from the thrust back surface portion to the damper surface.

An opposing portion provided in the shaft and opposite to the thrust surface and a space continuous in the axial direction to a clearance formed between the damper surface and the inner circumferential surface of the bearing hole, the space continuous in a radial direction of the shaft to a clearance formed between the opposing portion and the thrust surface may further be provided.

The thrust back surface portion may be inclined with respect to the radial direction of the shaft.

A circumferential groove extending in a circumferential direction of the main body portion and having an outer diameter smaller than that of the damper surface may be formed in the main body portion between the damper surface and the thrust back surface portion.

Either one or both of a radially protruding raised portion and a radially depressed portion may be formed on a surface of the circumferential groove.

The depressed portion may be an annular groove having a diameter smaller than that of the surface of the circumferential groove.

In order to solve the above problem, a turbocharger according to an aspect of the present disclosure includes the bearing structure described above.

Effects of Disclosure

According to the present disclosure, it is possible to improve cooling performance of a thrust surface formed at an end portion of a semi-floating bearing.

DESCRIPTION OF EMBODIMENT

Embodiment of the present disclosure will be described in detail below with reference to the accompanying drawings. Dimensions, materials, other specific numerical values, and the like illustrated in such embodiment are merely examples for facilitating understanding, and the present disclosure is not limited thereby except for a case where it is specifically mentioned. Note that, in the present specification and the drawings, elements having substantially the same function and structure are denoted by the same symbol, and redundant explanations are omitted. Components not directly related to the present disclosure are not illustrated.

Figure 1:
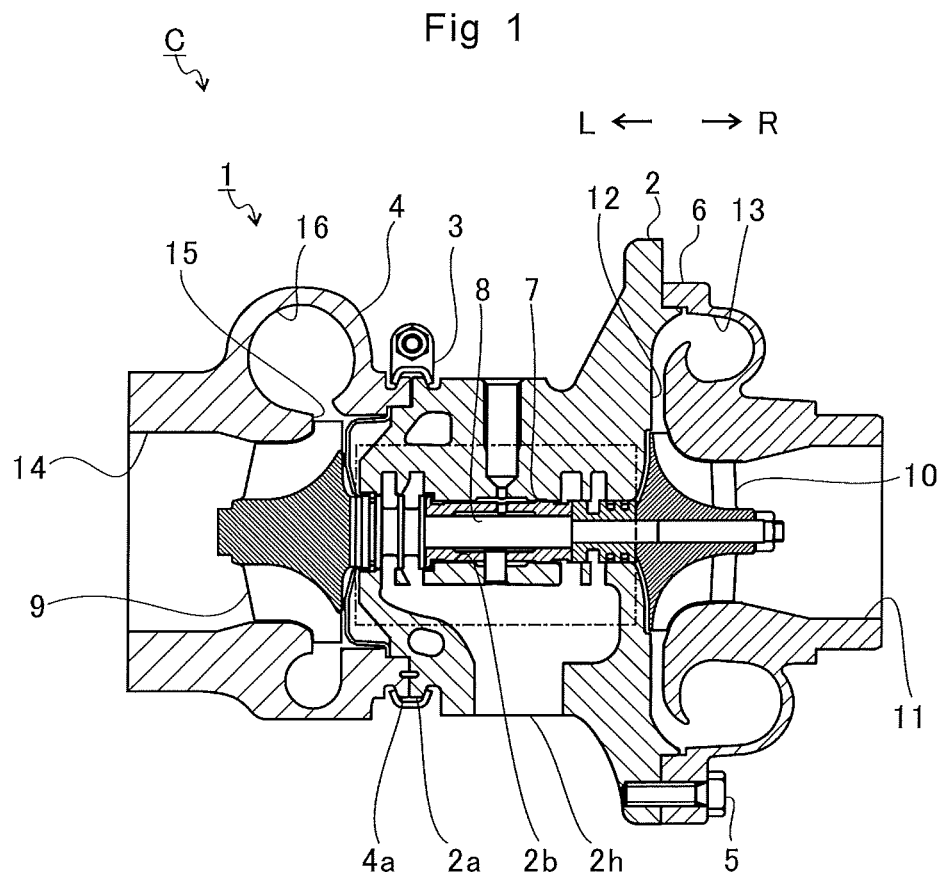
FIG. 1 is a schematic cross-sectional view of a turbocharger.

FIG. 1 is a schematic cross-sectional view of a turbocharger C. Hereinafter, descriptions are given assuming that a direction of an arrow L illustrated in FIG. 1 is the left side of the turbocharger C. Descriptions are given assuming that a direction of an arrow R illustrated in FIG. 1 is the right side of the turbocharger C. As illustrated in FIG. 1, the turbocharger C includes a turbocharger main body 1. The turbocharger main body 1 includes a bearing housing 2 (housing). A turbine housing 4 is connected to the left side of the bearing housing 2 by a fastening mechanism 3. A compressor housing 6 is connected to the right side of the bearing housing 2 by a fastening bolt 5. The bearing housing 2, the turbine housing 4, and the compressor housing 6 are integrated.

A projection 2a is provided on the outer circumferential surface of the bearing housing 2. The projection 2a is provided in the vicinity of the turbine housing 4. The projection 2a protrudes in a radial direction of the bearing housing 2. Moreover, a projection 4a is provided on the outer circumferential surface of the turbine housing 4. The projection 4a is provided in the vicinity of the bearing housing 2. The projection 4a protrudes in a radial direction of the turbine housing 4. The bearing housing 2 and the turbine housing 4 are fixed to each other by fastening the projections 2a and 4a by the fastening mechanism 3. The fastening mechanism 3 is formed by, for example, a G coupling which clamps the projections 2a and 4a.

A bearing hole 2b is formed in the bearing housing 2. The bearing hole 2b penetrates in a right-and-left direction of the turbocharger C. In the bearing hole 2b, a semi-floating bearing 7 (bearing) is provided. A shaft 8 is pivotally supported by the semi-floating bearing 7 in a freely rotatable manner. At a left end portion of the shaft 8, a turbine impeller 9 is provided. The turbine impeller 9 is accommodated in the turbine housing 4 in a freely rotatable manner. Furthermore, a compressor impeller 10 is provided at a right end portion of the shaft 8. The compressor impeller 10 is accommodated in the compressor housing 6 in a freely rotatable manner.

An intake port 11 is formed in the compressor housing 6. The intake port 11 opens to the right side of the turbocharger C. The intake port 11 is connected to an air cleaner (not illustrated). Furthermore, in a state in which the bearing housing 2 and the compressor housing 6 are connected by the fastening bolt 5, a diffuser flow passage 12 is formed. The diffuser flow passage 12 is formed by opposing surfaces of the bearing housing 2 and the compressor housing 6. The diffuser flow passage 12 pressurizes the air. The diffuser flow passage 12 is annularly formed outward from an inner side in the radial direction of the shaft 8. The diffuser flow passage 12 communicates with the intake port 11 via the compressor impeller 10 on the inner side in the radial direction.

Furthermore, the compressor housing 6 includes a compressor scroll flow passage 13. The compressor scroll flow passage 13 is annular. The compressor scroll flow passage 13 is positioned on an outer side in the radial direction of the shaft 8 with respect to the diffuser flow passage 12. The compressor scroll flow passage 13 communicates with an intake port of an engine (not illustrated). The compressor scroll flow passage 13 also communicates with the diffuser flow passage 12. When the compressor impeller 10 rotates, therefore, the air is sucked into the compressor housing 6 from the intake port 11. The sucked air is accelerated by the action of the centrifugal force in the process of flowing through blades of the compressor impeller 10. The accelerated air is pressurized by the diffuser flow passage 12 and the compressor scroll flow passage 13. The pressurized air is guided to the intake port of the engine.

A discharge port 14 is formed in the turbine housing 4. The discharge port 14 opens to the left side of the turbocharger C. The discharge port 14 is connected to an exhaust gas purification device (not illustrated). Furthermore, in the turbine housing 4, a flow passage 15 and a turbine scroll flow passage 16 are provided. The turbine scroll flow passage 16 is annular. A turbine scroll flow passage 16 is positioned outward in the radial direction of the turbine impeller 9 with respect to the flow passage 15. The turbine scroll flow passage 16 communicates with a gas inlet port (not illustrated). Exhaust gas discharged from an exhaust manifold of the engine (not illustrated) is guided to the gas inlet port. The gas inlet port also communicates with the above flow passage 15. Therefore, the exhaust gas guided from the gas inlet port to the turbine scroll flow passage 16 is guided to the discharge port 14 via the flow passage 15 and the turbine impeller 9. The exhaust gas guided to the discharge port 14 rotates the turbine impeller 9 in the process of flowing therethrough.

The turning force of the turbine impeller 9 is then transmitted to the compressor impeller 10 via the shaft 8. As described above, the turning force of the compressor impeller 10 causes the air to be pressurized and guided to the intake port of the engine.

Figure 2:
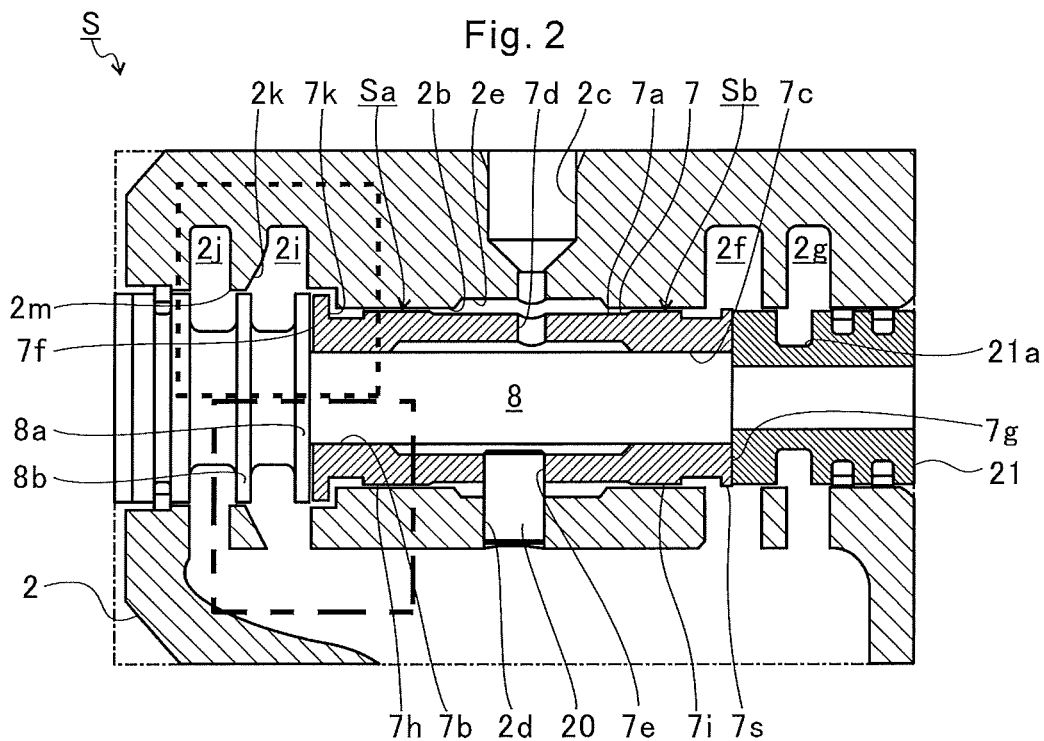
FIG. 2 is a view of a one-dot chain line part extracted from FIG. 1.

FIG. 2 is a view extracted from a one-dot chain line part of FIG. 1. As illustrated in FIG. 2, a bearing structure S is provided inside the bearing housing 2. In the bearing structure S, an oil passage 2c is formed in the bearing housing 2. The oil passage 2c opens to the bearing hole 2b. Lubricating oil flows into the bearing hole 2b from the oil passage 2c. The lubricating oil flowing into the bearing hole 2b is supplied to the semi-floating bearing 7 provided in the bearing hole 2b.

The semi-floating bearing 7 has an annular main body portion 7a. The shaft 8 is inserted inside the main body portion 7a. On an inner circumferential surface of the main body portion 7a, two bearing surfaces 7b and 7c are formed. The two bearing surfaces 7b and 7c are spaced apart in the axial direction of the shaft 8 (hereinafter simply referred to as the axial direction).

An oil hole 7d is formed in the main body portion 7a. The oil hole 7d penetrates through the main body portion 7a from the inner circumferential surface thereof to the outer circumferential surface thereof. A part of the lubricating oil supplied to the bearing hole 2b passes through the oil hole 7d and flows into the inner circumferential surface of the main body portion 7a. The lubricating oil flowed into the inner circumferential surface of the main body portion 7a is supplied to a clearance between the shaft 8 and each of the bearing surfaces 7b and 7c. The shaft 8 is pivotally supported by the oil film pressure of the lubricating oil supplied to the clearance between the shaft 8 and each of the bearing surfaces 7b and 7c.

A through hole 7e is further provided in the main body portion 7a. The through hole 7e penetrates the main body portion 7a from the inner circumferential surface thereof to the outer circumferential surface thereof. A pin hole 2d is formed in the bearing housing 2. The pin hole 2d is formed at a portion facing the through hole 7e. The pin hole 2d penetrates through a wall portion forming the bearing hole 2b. A positioning pin 20 is press-fitted into the pin hole 2d from the lower side in FIG. 2. A tip of the positioning pin 20 is inserted into the through hole 7e of the semi-floating bearing 7. The positioning pin 20 regulates rotation and movement in the axial direction of the semi-floating bearing 7.

Furthermore, an oil thrower member 21 (opposing portion) is fixed to the shaft 8. The oil thrower member 21 is arranged on the right side (the compressor impeller 10 side) in FIG. 2 with respect to the main body portion 7a. The oil thrower member 21 is an annular member. The oil thrower member 21 scatters the lubricating oil flowing to the compressor impeller 10 side along the shaft 8 in the axial direction to the outer side in the radial direction. That is, leakage of lubricating oil to the compressor impeller 10 side is suppressed by the oil thrower member 21.

In addition, the shaft 8 includes a first large diameter portion 8a (opposing portion). The first large diameter portion 8a has an outer diameter larger than an inner diameter of the bearing surface 7b of the main body portion 7a. The first large diameter portion 8a is positioned on the left side (the turbine impeller 9 side) in FIG. 2 with respect to the main body portion 7a. The first large diameter portion 8a axially faces the main body portion 7a.

In this manner, movement of the main body portion 7a in the axial direction is restricted by the positioning pin 20. The main body portion 7a is interposed between the oil thrower member 21 and the first large diameter portion 8a in the axial direction. Lubricating oil is supplied to a clearance between the main body portion 7a and the oil thrower member 21. Lubricating oil is supplied to a clearance between the main body portion 7a and the first large diameter portion 8a. When the shaft 8 moves in the axial direction, the oil thrower member 21 or the first large diameter portion 8a is supported by the oil film pressure between the oil thrower member 21 or the large diameter portion 8a and the main body portion 7a. That is, in the semi-floating bearing 7, both axial end portions of the main body portion 7a in the axial direction form thrust surfaces 7f and 7g. The thrust surfaces 7f and 7g face the first large diameter portion 8a and the oil thrower member 21, respectively. The thrust surfaces 7f and 7g receive a thrust load from the first large diameter portion 8a and the oil thrower member 21, respectively.

Furthermore, damper surfaces 7h and 7i are formed on each of both axial end sides of the outer circumferential surface of the main body portion 7a. Between the damper surfaces 7h and 7i and an inner circumferential surface 2e of the bearing hole 2b, clearances Sa and Sb, respectively, are formed. Vibration of the shaft 8 is suppressed by the oil film pressure of the lubricating oil supplied to the clearances Sa and Sb from the oil passage 2c.

Furthermore, two first spaces 2f and 2g (spaces) are formed in the bearing housing 2 on the oil thrower member 21 side (the compressor impeller 10 side) of the bearing hole 2b. The two first spaces 2f and 2g are spaced apart in the axial direction. In addition, a partition wall is formed between the two first spaces 2f and 2g. The first spaces 2f and 2g extend radially outward from the bearing hole 2b. Lower sides of the first spaces 2f and 2g are open. The lubricating oil having reached the oil thrower member 21 scatters radially outward in the first spaces 2f and 2g by the centrifugal force. The scattered lubricating oil is discharged from an oil discharge port 2h (see FIG. 1).

Similarly, two first spaces 2i and 2j (spaces) are formed in the bearing housing 2 on the first large diameter portion 8a side (the turbine impeller 9 side) of the bearing hole 2b. The two first spaces 2i and 2j are spaced apart in the axial direction. The first spaces 2i and 2j extend radially outward from the bearing hole 2b. Lower sides of the first spaces 2i and 2j are open. Furthermore, the first space 2i is closer to the bearing hole 2b than the first space 2j is. The first space 2i is positioned on the left side (the turbine impeller 9 side) in FIG. 2 with respect to the thrust surface 7f in the axial direction of the shaft 8. An inclined surface 2k is provided on an inner wall surface of the first space 2i. The inclined surface 2k is formed on a partition wall 2m positioned between the two first spaces 2i and 2j. The inclined surface 2k is inclined radially inward as the inclined surface 2k is spaced apart from the bearing hole 2b toward the turbine impeller 9.

The shaft 8 further includes a second large diameter portion 8b. The second large diameter portion 8b is spaced apart from the first large diameter portion 8a in the axial direction toward the left side (the turbine impeller 9 side) in FIG. 2. The second large diameter portion 8b is positioned radially inward of the partition wall 2m and the inclined surface 2k. A part of the lubricating oil having reached the first large diameter portion 8a is scattered radially outward by the centrifugal force. A part of the lubricating oil having reached the first large diameter portion 8a reaches the second large diameter portion 8b. A part of the lubricating oil having reached the second large diameter portion 8b is scattered radially outward by the centrifugal force. The lubricating oil scattered to the first large diameter portion 8a and the second large diameter portion 8b is discharged from the oil discharge port 2h (see FIG. 1) via the first space 2i. The lubricating oil having passed through a clearance between the second large diameter portion 8b and the partition wall 2m is discharged from the oil discharge port 2h via the first space 2j.

Figure 3:
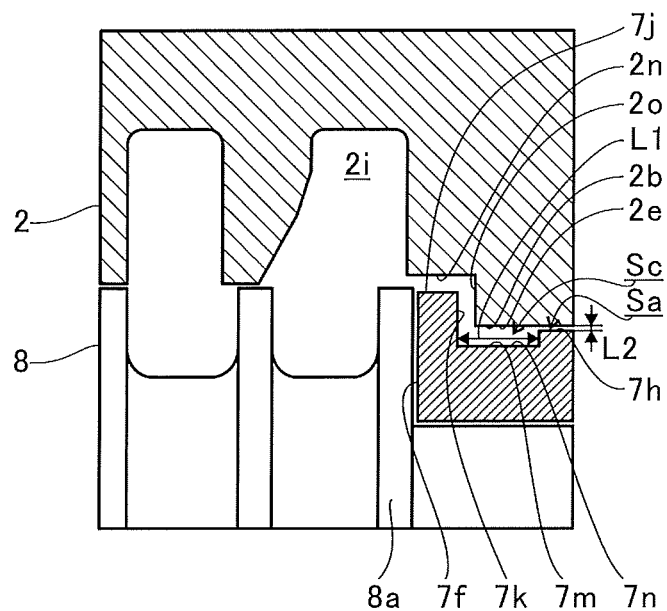
FIG. 3 is a view of a broken line part extracted from FIG. 2.

FIG. 3 is a view of a broken line part extracted from FIG. 2. As illustrated in FIG. 3, a large inner diameter portion 2n is provided in the bearing hole 2b. The large inner diameter portion 2n is provided at an end portion of the bearing hole 2b on the first large diameter portion 8a side. The large inner diameter portion 2n is formed to have an inner diameter larger than that of an opposing portion of the bearing hole 2b facing the damper surface 7h.

A protruding portion 7j is provided on an end portion of the main body portion 7a of the semi-floating bearing 7 on the thrust surface 7f side. The protruding portion 7j extends annularly in the circumferential direction of the main body portion 7a. An outer diameter of the protruding portion 7j is larger than an outer diameter of the damper surface 7h. The outer diameter of the protruding portion 7j is smaller than an inner diameter of the large inner diameter portion 2n of the bearing hole 2b. The protruding portion 7j is positioned radially inward with respect to the large inner diameter portion 2n.

An end surface of the protruding portion 7j on the first large diameter portion 8a side forms the thrust surface 7f. On the side opposite to the first large diameter portion 8a of the protruding portion 7j, a thrust back surface portion 7k is formed. The thrust back surface portion 7k is positioned between the thrust surface 7f and the damper surface 7h. The thrust back surface portion 7k has an outer diameter larger than that of the damper surface 7h. The thrust back surface portion 7k faces the clearance Sa. That is, the thrust back surface portion 7k is opposite to the clearance Sa in the axial direction.

Furthermore, the thrust back surface portion 7k and the damper surface 7h are spaced apart in the axial direction. An extending portion 7m is formed on the outer circumferential surface of the main body portion 7a. The extending portion 7m extends from the protruding portion 7j to the damper surface 7h. A length L1 of the extending portion 7m in the axial direction is larger than a length of the clearance Sa in the radial direction of the shaft 8 (that is, a distance L2 between the damper surface 7h and the inner circumferential surface 2e of the bearing hole 2b). Here, the length of the clearance Sa in the radial direction of the shaft 8 indicates a clearance between an inner diameter of the inner circumferential surface 2e of the bearing hole 2b and an outer diameter of the damper surface 7h in the radial direction. The length L1 of the extending portion 7m in the axial direction can be rephrased as a distance from an end portion of the damper surface 7h on the turbine impeller 9 side to the thrust back surface portion 7k. That is, the thrust back surface portion 7k is spaced apart from the damper surface 7h farther than the distance L2 between the damper surface 7h and the inner circumferential surface 2e of the bearing hole 2b.

Here, the extending portion 7m is formed by a circumferential groove 7n. The circumferential groove 7n has an outer diameter smaller than that of the damper surface 7h. A second space Sc is formed radially outward from the extending portion 7m. The second space Sc is provided between the thrust back surface portion 7k and the damper surface 7h.

The lubricating oil having passed through the clearance Sa is ejected into the second space Sc from the clearance Sa and blown onto the thrust back surface portion 7k. The lubricating oil blown onto the thrust back surface portion 7k joins the lubricating oil lubricating the thrust surface 7f. The joined lubricating oil flows into the first space 2i side. At this time, the thrust back surface portion 7k is cooled by the lubricating oil. Along with this, the thrust surface 7f is cooled.

As described above, the length L1 of the extending portion 7m in the axial direction is larger than the distance L2 (the length of the clearance Sa in the radial direction) between the damper surface 7h and the inner circumferential surface 2e of the bearing hole 2b (that is, the second space Sc is provided). Therefore, the outer circumferential side of the main body portion 7a of the semi-floating bearing 7 is easily cooled. The cooling performance can be improved. It is possible to suppress heat transfer from the thrust surface 7f toward the center of the main body portion 7a or the damper surface 7h (for example, the right side in FIG. 2).

Furthermore, here, the extending portion 7m is formed by the circumferential groove 7n. A cross-sectional area of the extending portion 7m perpendicular to the axial direction of the shaft 8 becomes small. Therefore, heat transfer from the thrust surface 7f to the main body portion 7a or the bearing housing 2 side is suppressed.

In addition, the thrust back surface portion 7k has an outer diameter larger than that of the damper surface 7h. Therefore, the lubricating oil ejected from the clearance Sa is easily blown thereto. The thrust surface 7f is efficiently cooled.

An end surface 2o of the large inner diameter portion 2n of the bearing housing 2 on the damper surface 7h side is located closer to the thrust back surface portion 7k than to the damper surface 7h. That is, the bearing housing 2 protrudes axially towards the second space Sc with respect to the damper surface 7h. Therefore, the lubricating oil ejected into the second space Sc from the clearance Sa is prevented from diffusing outward in the radial direction of the shaft 8. The lubricating oil ejected into the second space Sc is easily blown directly onto the thrust back surface portion 7k. The thrust surface 7f is efficiently cooled.

Figure 4A:
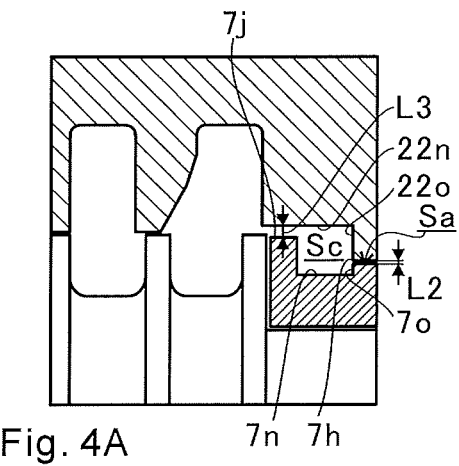
FIG. 4A is a cross-sectional view of a position corresponding to FIG. 3 of a first modification.
Figure 4B:
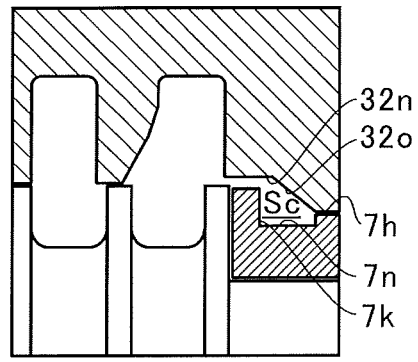
FIG. 4B is a cross-sectional view of a position corresponding to FIG. 3 of a second modification.
Figure 4C:
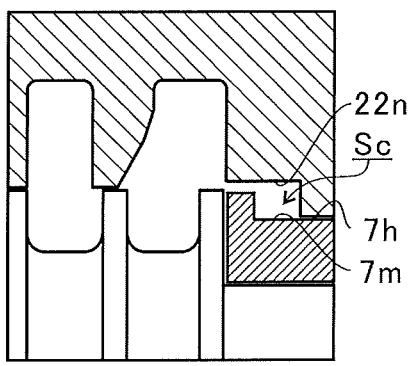
FIG. 4C is a cross-sectional view of a position corresponding to FIG. 3 of a third modification.
Figure 4D:
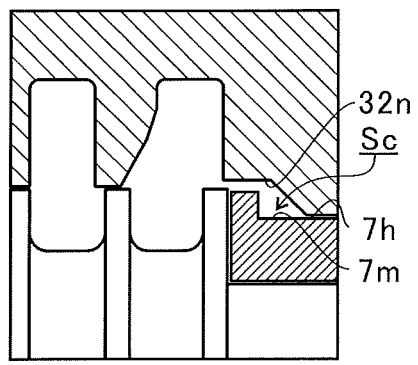
FIG. 4D is a cross-sectional view of a position corresponding to FIG. 3 of a fourth modification.
Figure 4E:
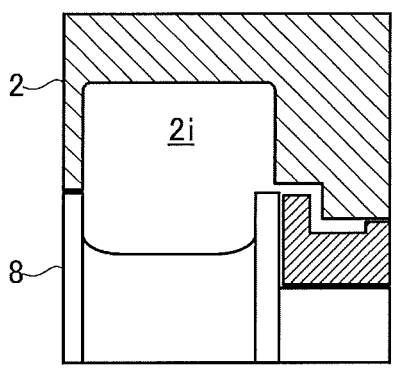
FIG. 4E is a cross-sectional view of a position corresponding to FIG. 3 of a fifth modification.
Figure 4F:
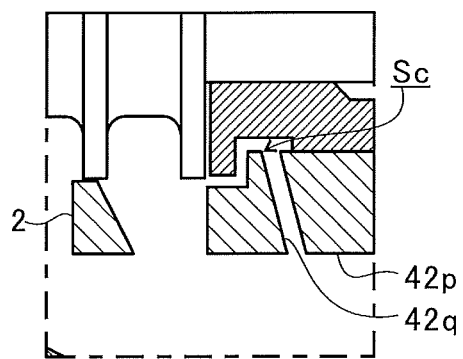
FIG. 4F is a cross-sectional view of a position corresponding to a one-dot chain line part of FIG. 2 of a sixth modification.

FIG. 4A is a cross-sectional view of a position corresponding to FIG. 3 of a first modification. FIG. 4B is a cross-sectional view of a position corresponding to FIG. 3 of a second modification. FIG. 4C is a cross-sectional view of a position corresponding to FIG. 3 of a third modification. FIG. 4D is a cross-sectional view of a position corresponding to FIG. 3 of a fourth modification. FIG. 4E is a cross-sectional view of a position corresponding to FIG. 3 of a fifth modification. FIG. 4F is a cross-sectional view of a position corresponding to a one-dot chain line part of FIG. 2 of a sixth modification.

As illustrated in FIG. 4A, in the first modification, a large inner diameter portion 22n extends toward a damper surface 7h to approximately the same position as a circumferential groove 7n. That is, the position of an end surface 22o on the damper surface 7h side of the large inner diameter portion 22n is substantially the same in the axial direction as that of an end surface 7o of the circumferential groove 7n on the damper surface 7h side. Therefore, a second space Sc is ensured to be large. The entire inner wall of the circumferential groove 7n is cooled over a wide range.

Moreover, a length L3 is the length of a clearance between a protruding portion 7j and the large inner diameter portion 22n in the radial direction of the shaft 8. The length L3 is larger than the radial length (distance L2) of a clearance Sa. Therefore, lubricating oil ejected into the second space Sc from the clearance Sa is easily discharged from the second space Sc. The flow of the lubricating oil in the second space Sc is facilitated. The cooling effect is improved.

As illustrated in FIG. 4B, in the second modification, an end surface 32o of a large inner diameter portion 32n is inclined as compared to the first modification. The end surface 32o is inclined with respect to the radial direction of a shaft 8. The end surface 32o is inclined inward in the radial direction as the end surface 32o approaches a damper surface 7h. Therefore, a large size of a second space Sc is ensured, and lubricating oil is easily guided toward a thrust back surface portion 7k. The thrust back surface portion 7k is efficiently cooled.

As illustrated in FIGS. 4C and 4D, in the third and the fourth modifications, a circumferential groove 7n is not formed as compared to the first and the second modifications. An extending portion 7m is flush with a damper surface 7h. In this manner, in a case where large inner diameter portions 22n and 32n are formed to be large, a second space Sc is secured even without forming a circumferential groove 7n, and the cooling performance is improved. In addition, as compared to the case of forming the circumferential groove 7n, processing costs are reduced.

As illustrated in FIG. 4E, in the fifth modification, a partition wall 2m and a first space 2j are not formed in a bearing housing 2. Accordingly, a first space 2i is formed to be larger than the embodiment described above and the other modifications. In addition, a second large diameter portion 8b is not provided in the shaft 8. In this case, processing costs of the bearing housing 2 and the shaft 8 are reduced as compared to the configuration in which the first space 2j is formed and the second large diameter portion 8b is provided.

As illustrated in FIG. 4F, in the sixth modification, a communication hole 42q is provided in a wall portion 42p forming a bearing hole 2b in a bearing housing 2. One end of the communication hole 42q is open to a second space Sc. The other end of the communication hole 42q is open to an oil discharge port 2h. By including the communication hole 42q, lubricating oil is easily discharged from the second space Sc. The flow of lubricating oil in the second space Sc is facilitated. The cooling effect is improved.

Figure 5A:
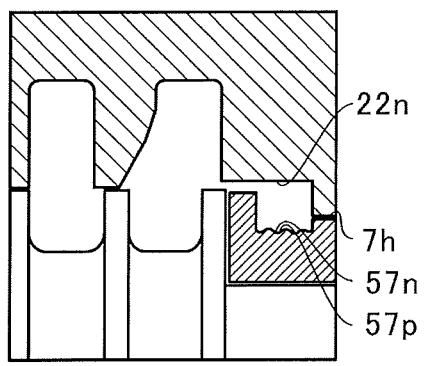
FIG. 5A is a cross-sectional view of a position corresponding to FIG. 3 of a seventh modification.
Figure 5B:
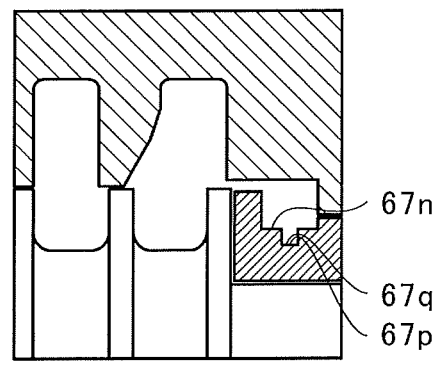
FIG. 5B is a cross-sectional view of a position corresponding to FIG. 3 of an eighth modification.
Figure 5C:
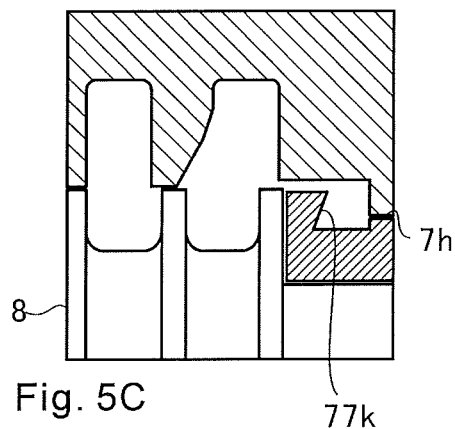
FIG. 5C is a cross-sectional view of a position corresponding to FIG. 3 of a ninth modification.

FIG. 5A is a cross-sectional view of a position corresponding to FIG. 3 of a seventh modification. FIG. 5B is a cross-sectional view of a position corresponding to FIG. 3 of an eighth modification. FIG. 5C is a cross-sectional view of a position corresponding to FIG. 3 of a ninth modification. In the seventh to ninth modifications as illustrated in FIGS. 5A to 5(c), similarly to the first modification described above, a large inner diameter portion 22n extends toward a damper surface 7h to substantially the same position as those of circumferential grooves 57n and 67n.

As illustrated in FIG. 5A, in the seventh modification, a depressed portion 57p is formed on a surface of the circumferential groove 57n. The depressed portion 57p is a portion of the surface of the circumferential groove 57n depressed in the radial direction of a shaft 8. In the example illustrated in FIG. 5A, three depressed portions 57p are provided while spaced apart in the axial direction. Only a single depressed portion 57p may be provided. Two depressed portions 57p may be provided while spaced apart in the axial direction. Four or more depressed portions 57p may be provided while spaced apart in the axial direction. The surface area of the circumferential groove 57n is increased by the depressed portions 57p. Here, the case where the depressed portion 57p is provided has been described. However, raised portions protruding in the radial direction of the shaft 8 may be provided on the surface of the circumferential groove 57n. Both of the depressed portion 57p and the raised portion may be provided. In either case, the surface area of the circumferential groove 57n is increased. The circumferential groove 57n is easily cooled by lubricating oil. Therefore, the cooling performance is improved. In addition, the depressed portion 57p and the raised portion may be of any shape. For example, a helical groove like a screw may be provided on the surface of the circumferential groove 57 as an example of the depressed portion 57p and the raised portion.

As illustrated in FIG. 5B, in the eighth modification, a depressed portion 67p is formed by an annular groove 67q. A bottom surface of the annular groove 67q has a diameter smaller than that of a surface of a circumferential groove 67n. In the case of including the annular groove 67q, similarly to the seventh modification, the surface area of the circumferential groove 67n is increased. The circumferential groove 67n is easily cooled by lubricating oil. In the case of including the annular groove 67q, processing is easier as compared to the depressed portion 57p of the seventh modification.

As illustrated in FIG. 5C, in the ninth modification, a thrust back surface portion 77k is inclined with respect to the radial direction of a shaft 8. Here, the thrust back surface portion 77k is inclined outward in the radial direction as the thrust back surface portion 77k approaches a damper surface 7h. Note that the thrust back surface portion 77k may be inclined in a direction inward in the radial direction as the thrust back surface portion 77k approaches the damper surface 7h. In either case, by inclining the thrust back surface portion 77k with respect to the radial direction, the surface area of the thrust back surface portion 77k is increased. The cooling performance is improved.

Figure 6:
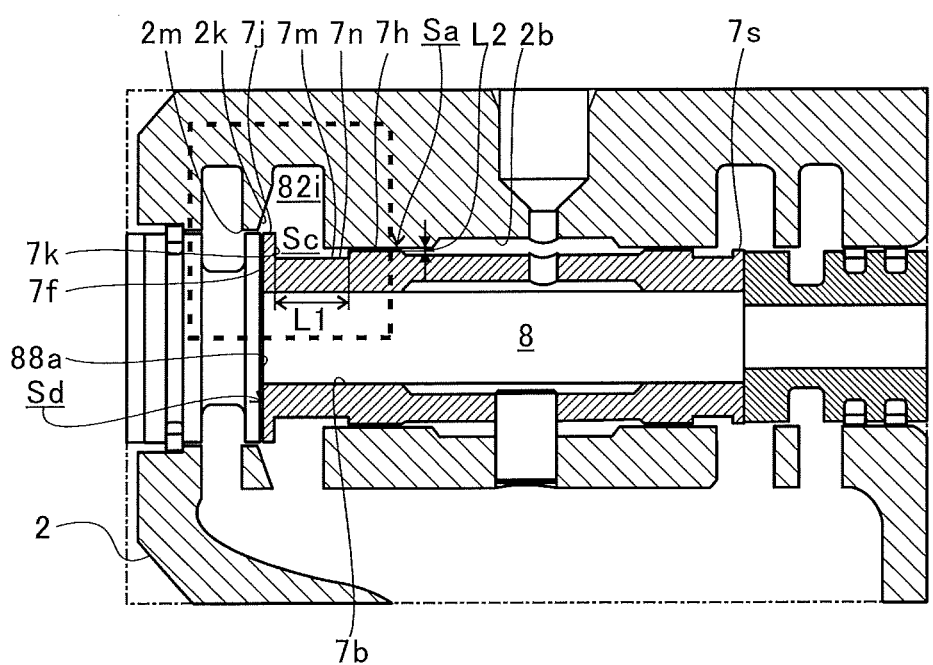
FIG. 6 is a cross-sectional view of a position corresponding to FIG. 2 of a tenth modification.

FIG. 6 is a cross-sectional view of a position corresponding to FIG. 2 of a tenth modification. As illustrated in FIG. 6, in the tenth modification, large inner diameter portions 2n, 22n, and 32n are not provided in a bearing hole 2b of a bearing housing 2. A second large diameter portion 8b is not provided in a shaft 8.

Similarly to the first large diameter portion 8a described above, a first large diameter portion 88a (opposing portion) faces a thrust surface 7f. The first large diameter portion 88a is arranged at the same position as that of the second large diameter portion 8b. That is, the first large diameter portion 88a is positioned radially inward from a partition wall 2m (inclined surface 2k).

Furthermore, similarly to the embodiment described above, an extending portion 7m is formed between a thrust back surface portion 7k and a damper surface 7h. The extending portion 7m extends from a protruding portion 7j to the damper surface 7h. A length L1 of the extending portion 7m in the axial direction is larger than a length L2 of the shaft 8 in a clearance Sa in the radial direction. The extending portion 7m is formed by a circumferential groove 7n. The circumferential groove 7n has an outer diameter smaller than that of the damper surface 7h. A second space Sc is formed radially outward from the extending portion 7m. The second space Sc is provided between the thrust back surface portion 7k and the damper surface 7h.

Similarly to the embodiment described above, also in the tenth modification the thrust back surface portion 7k is cooled by lubricating oil having passed through the clearance Sa. Moreover, a length L1 of the extending portion 7m in the axial direction is larger than a length (distance L2) of the clearance Sa in the radial direction (that is, the second space Sc is provided). Therefore, the cooling performance is improved. Furthermore, heat transfer from the thrust surface 7f to a main body portion 7a and a bearing housing 2 side is suppressed. Temperature rise of a bearing surface 7b is suppressed.

In addition, a first space 82i (space) is continuous with the bearing hole 2b similarly to the embodiment described above. The first space 82i discharges the lubricating oil supplied to the bearing surface 7b and the damper surface 7h from the bearing hole 2b. However, unlike the embodiment described above, the first space 82i is continuous with the clearance Sa in the axial direction. The first space 82i is continuous with a clearance Sd in the radial direction of the shaft 8. The clearance Sd is formed between the first large diameter portion 88a and the thrust surface 7f.

Therefore, both of the lubricating oil having been ejected from the clearance Sa and cooled the thrust back surface portion 7k and the lubricating oil having lubricated the thrust surface 7f are efficiently discharged to an oil discharge port 2h via the first space 82i. The flow of the lubricating oil is improved. The cooling efficiency can be improved.

Furthermore, the first large diameter portion 88a is positioned radially inward from the inclined surface 2k. Therefore, the lubricating oil scattered from the clearance Sd between the first large diameter portion 88a and the thrust surface 7f is smoothly guided radially outward in the first space 82i. The flow of the lubricating oil ejected from the clearance Sa into the second space Sc is unlikely to be inhibited. The flow of the lubricating oil is improved. The cooling efficiency can be improved.

Similarly to the embodiment described above, an inner wall surface of the bearing housing 2 on the side of the damper surface 7h forming the first space 82i protrudes in the axial direction from the damper surface 7h toward the second space Sc. Therefore, the lubricating oil ejected into the second space Sc from the clearance Sa is prevented from diffusing outward in the radial direction of the shaft 8. The lubricating oil ejected into the second space Sc is easily blown directly onto the thrust back surface portion 7k. This enables efficient cooling of the thrust surface 7f.

Figure 7A:
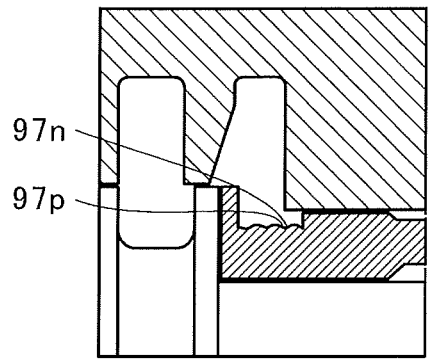
FIG. 7A is a cross-sectional view of a position corresponding to a broken line part of FIG. 6 of an eleventh modification.
Figure 7B:
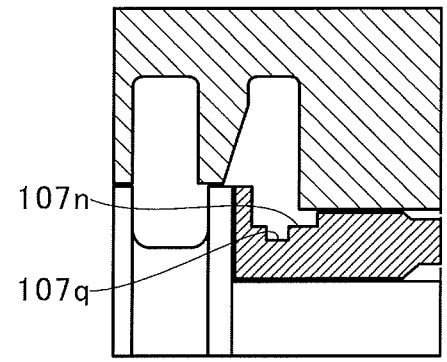
FIG. 7B is a cross-sectional view of a position corresponding to the broken line part of FIG. 6 of a twelfth modification.
Figure 7C:
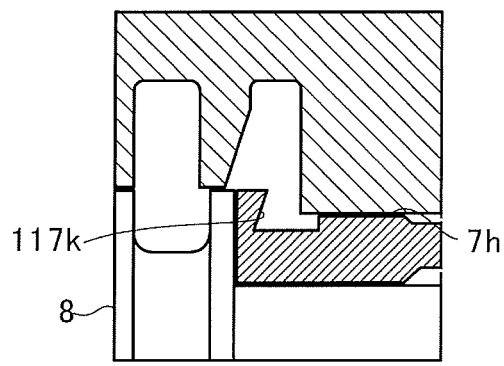
FIG. 7C is a cross-sectional view of a position corresponding to the broken line part of FIG. 6 of a thirteenth modification.
Figure 7D:
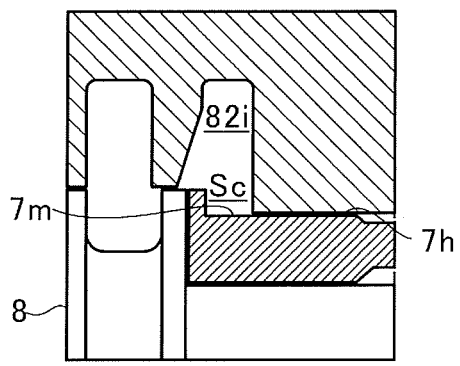
FIG. 7D is a cross-sectional view of a position corresponding to the broken line part of FIG. 6 of a fourteenth modification.
Figure 7E:
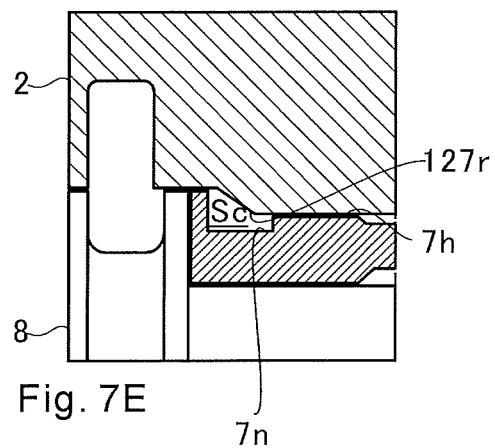
FIG. 7E is a cross-sectional view of a position corresponding to the broken line part of FIG. 6 of a fifteenth modification.

FIG. 7A is a cross-sectional view of a position corresponding to a broken line part of FIG. 6 of an eleventh modification. FIG. 7B is a cross-sectional view of a position corresponding to the broken line part of FIG. 6 of a twelfth modification. FIG. 7C is a cross-sectional view of a position corresponding to the broken line part of FIG. 6 of a thirteenth modification. FIG. 7D is a cross-sectional view of a position corresponding to the broken line part of FIG. 6 of a fourteenth modification. FIG. 7E is a cross-sectional view of a position corresponding to the broken line part of FIG. 6 of a fifteenth modification. In the eleventh to the fifteenth modifications, large inner diameter portions 2n, 22n, and 32n are not provided in a bearing hole 2b of a bearing housing 2 similarly to the tenth modification described above. A second large diameter portion 8b is not provided in a shaft 8.

As illustrated in FIG. 7A, in the eleventh modification, depressed portions 97p are formed on a surface of a circumferential groove 97n similarly to the seventh modification. In the example illustrated in FIG. 7A, three depressed portions 97p are provided while spaced apart in the axial direction. Only a single depressed portion 97p may be provided. Two depressed portions 97p may be provided while spaced apart in the axial direction. Four or more depressed portions 97p may be provided while spaced apart in the axial direction. Here, the case where the depressed portions 97p are provided has been described. However, protrusions protruding in the radial direction of the shaft 8 may be provided on the surface of the circumferential groove 97n. In either case, the surface area of the circumferential groove 97n is increased. The circumferential groove 97n is easily cooled by lubricating oil. The cooling performance is improved.

As illustrated in FIG. 7B, in the twelfth modification, an annular groove 107q is provided in a circumferential groove 107n similarly to the eighth modification. Therefore, the surface area of the circumferential groove 107n is increased. The cooling performance is improved. Processing costs are reduced.

As illustrated in FIG. 7C, in the thirteenth modification, a thrust back surface portion 117k is inclined with respect to the radial direction of the shaft 8 similarly to the ninth modification. Here, the thrust back surface portion 117k is inclined outward in the radial direction as the thrust back surface portion 117k approaches a damper surface 7h. Note that the thrust back surface portion 117k may be inclined in a direction inward in the radial direction as the thrust back surface portion 117k approaches the damper surface 7h. In either case, by inclining the thrust back surface portion 117k with respect to the radial direction, the surface area of the thrust back surface portion 117k is increased. The cooling performance is improved.

As illustrated in FIG. 7D, in the fourteenth modification, a circumferential groove 7n is not formed similarly to the third modification. An extending portion 7m is flush with a damper surface 7h. In this manner, even without forming the circumferential groove 7n, continuation of a second space Sc and a first space 82i substantially enlarges the second space Sc. The cooling performance is improved.

As illustrated in FIG. 7E, in the fifteenth modification, the first space 82i is not provided. An inner wall surface 127r of a bearing housing 2 faces a circumferential groove 7n from an outer side in the radial direction of a shaft 8. The inner wall surface 127r is inclined inward in the radial direction as the inner wall surface 127r approaches a damper surface 7h. Therefore, a second space Sc is ensured to be large. The cooling performance is improved.

Although the embodiment have been described with reference to the accompanying drawings, it is naturally understood that the present disclosure is not limited to the above embodiment. It is clear that those skilled in the art can conceive various modifications or variations within the scope described in the claims, and it is understood that they are naturally also within the technical scope.

For example in the embodiment and the first to the ninth modifications described above, the case where the first space 2i in the axial direction of the shaft 8 is positioned closer to the turbine impeller 9 (left side in the drawings) than to the thrust surface 7f has been explained. However, the first space 2i may extend from the thrust surface 7f to the compressor impeller 10 side (right side in the drawings).

Figure 8A:
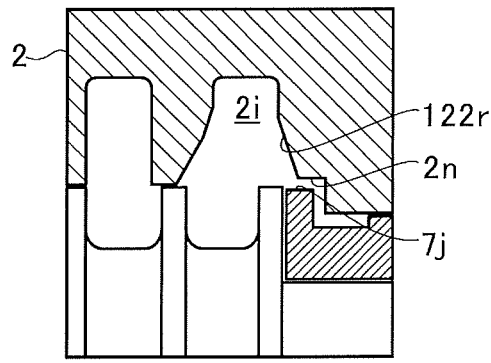
FIG. 8A is a cross-sectional view of a position corresponding to the broken line part of FIG. 6 of a sixteenth modification.
Figure 8B:
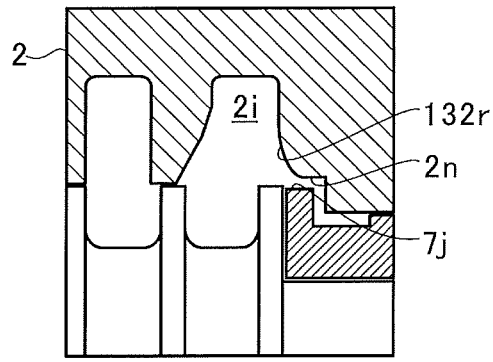
FIG. 8B is a cross-sectional view of a position corresponding to the broken line part of FIG. 6 of a seventeenth modification.

Furthermore, in the embodiment and the first to the ninth modifications described above, the case where an end portion, on an inner side in the radial direction, of the inner wall of the first space 2i on the compressor impeller 10 side is connected at right angles to an end portion, in the axial direction, of the large inner diameter portion 2n, 22n, or 32n on the turbine impeller 9 side has been described. However, for example, as in a sixteenth modification illustrated in FIG. 8A, an inclined surface 122r may be provided. Alternatively, a curved surface 132r may be provided as in a seventeenth modification illustrated in FIG. 8B. The inclined surface 122r and the curved surface 132r connect an end portion, on an inner side in the radial direction of an inner wall of a first space 2i on a compressor impeller 10 side and the an end portion, in the axial direction, of a large inner diameter portion 2n on A turbine impeller 9 side. In this case, a radial clearance between a protruding portion 7j of a semi-floating bearing 7 and a wall surface of a bearing housing 2 is enlarged. Therefore, as compared to the case where the inclined surface 122r or the curved surface 132r is not provided, lubricating oil is discharged to the first space 2i more easily. The cooling effect is improved.

Figure 8C:
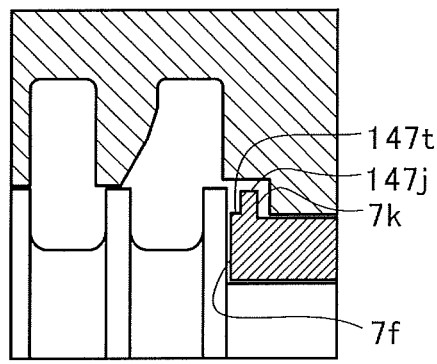
FIG. 8C is a cross-sectional view of a position corresponding to the broken line part of FIG. 6 of an eighteenth modification.
Figure 8D:
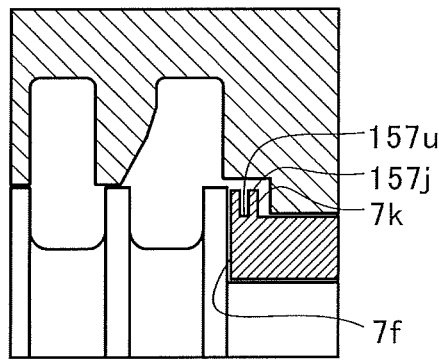
FIG. 8D is a cross-sectional view of a position corresponding to the broken line part of FIG. 6 of a nineteenth modification.

Furthermore, in the embodiment and the modifications described above, the case where the outer circumferential surface of the protruding portion 7j continuous to the thrust surface 7f and the thrust back surface portion 7k is parallel to the axial direction (outer diameter is constant) has been described. However, for example, an inclined surface or a curved surface may be provided on the outer circumferential surface of the protruding portion 7j. In this case, the outermost diameter in the radial direction out of the outer circumferential surface of the protruding portion 7j can be regarded as the outer diameter of the thrust back surface portion 7k. Moreover, the case where the outer circumferential surface of the protruding portion 7j and the thrust surface 7f are connected at right angles has been described. The case where the outer circumferential surface of the protruding portion 7j and the thrust back surface portion 7k are connected at right angles has been described. However, for example, an inclined surface, a curved surface, or the like may be provided at a corner portion connecting the outer circumferential surface of the protruding portion 7j and the thrust surface 7f For example, an inclined surface, a curved surface, or the like may be provided at a corner portion connecting the outer circumferential surface of the protruding portion 7j and the thrust back surface portion 7k. As in the eighteenth modification illustrated in FIG. 8C, a stepped portion 147t may be provided. The stepped portion 147t is provided in a protruding portion 147j on a thrust surface 7f side. As in the nineteenth modification illustrated in FIG. 8D, a groove portion 157u may be provided. The groove portion 157u extends, for example annularly, in a protruding portion 157j. In FIGS. 8C and 8D, the configuration in which the circumferential groove 7n is not provided is illustrated. However, in FIGS. 8C and 8D, the circumferential groove 7n may be provided.

Figure 8E:
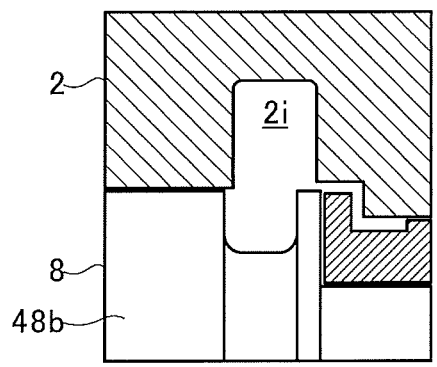
FIG. 8E is a cross-sectional view of a position corresponding to the broken line part of FIG. 6 of a twentieth modification.

Furthermore, in the fifth modification described above, the case where the first space 2i is formed while enlarged without providing the partition wall 2m has been described. However, as in a twentieth modification illustrated in FIG. 8E, the first space 2i may have a size similar to those of the other embodiment and modifications, and the first space 2j may not be provided. In this case, the second large diameter portion 48b of the shaft 8 extends to a seal member provided in the turbine impeller 9 side. For example, an inner groove extending in the circumferential direction may be provided on the inner circumferential surface of the bearing housing 2 facing the second large diameter portion 48b. Furthermore, a hole or a notch opens to the inner groove may be formed in the bearing housing 2. Similarly to the communication hole 42q of the sixth modification described above, this hole or notch may be open to the oil discharge port 2h. In this case, lubricating oil having flowed into the inner groove is discharged from the hole or the notch opening to the inner groove toward the oil discharge port 2h.

Furthermore, in the embodiment and the modifications described above, the cooling structure on the turbine impeller 9 side in the bearing structure S has been described in detail. The compressor impeller 10 side adopts a cooling structure similar to that of the turbine impeller 9 side. For example, the outer diameter of the protruding portion 7s (see FIGS. 2 and 6) on the compressor impeller 10 side may be smaller than the outer diameter of the protruding portion 7j on the turbine side. Furthermore, in accordance with the outer diameter of the protruding portion 7s on the compressor impeller 10 side, the inner diameter of the damper surface 7i on the compressor impeller 10 side and the inner circumferential surface 2e of the bearing hole 2b of the bearing housing 2 facing the damper surface 7i may be smaller than the inner diameter of the damper surface 7h on the turbine impeller 9 side and the inner diameter of the inner circumferential surface 2e facing the damper surface 7h. In this case, the semi-floating bearing 7 can be inserted into the bearing hole 2b from the turbine impeller 9 side. The semi-floating bearing 7 can be easily assembled. Furthermore, the cooling structure described above may be provided only in one of the turbine impeller 9 side and the compressor impeller 10 side. In the cooling structure described above, different configurations may be adopted in the turbine impeller 9 side and the compressor impeller 10 side from the embodiment and the modifications described above.

Moreover, in the first modification described above, the case where the length L3 of the clearance between the protruding portion 7j and the large inner diameter portion 22n in the radial direction of the shaft 8 is larger than the radial length (distance L2) of the clearance Sa has been described. This configuration is also applied to the second to the fourth modifications and the seventh to the ninth modifications. However, in the first to the fourth modifications and the seventh to the ninth modifications, the length L3 of the clearance between the protruding portion 7j and the large inner diameter portion 22n in the radial direction of the shaft 8 may be substantially the same as the radial length (distance L2) of the clearance Sa.

INDUSTRIAL APPLICABILITY

The present disclosure can be applied to a bearing structure pivotally supporting a shaft and a turbocharger.

What is claimed is:
1. A bearing structure comprising:
a bearing hole formed in a housing;
a main body portion of a bearing provided in the bearing hole and inserted with a shaft therethrough;
a damper surface provided on an outer circumferential surface of the main body portion, the damper surface facing an inner circumferential surface of the bearing hole;
a protruding portion provided at an end portion of the main body portion in an axial direction of the shaft, the protruding portion having an outer diameter larger than that of the damper surface;
a thrust surface provided in the protruding portion;
a thrust back surface portion provided in the protruding portion, the thrust back surface portion spaced apart from the damper surface by a distance farther than a distance between the damper surface and the inner circumferential surface of the bearing hole and positioned on a back side of the thrust surface;

a large inner diameter portion formed in the bearing hole, the protruding portion is positioned radially inward of the larger inner diameter portion, the larger inner diameter portion is formed to have an inner diameter larger than that of an opposing portion of the bearing hole facing the damper surface;

an extending portion provided on the main body portion extending from the thrust back surface portion to the damper surface, at least a part of the extending portion is positioned radially inward with respect to the large inner diameter portion; and a space provided between the extending portion and an inner circumferential surface of the large inner diameter portion.

2. The bearing structure according to claim 1, wherein the thrust back surface portion is inclined with respect to a radial direction of the shaft.

3. The bearing structure according to claim 2, wherein a circumferential groove extending in a circumferential direction of the main body portion and having an outer diameter smaller than that of the damper surface is formed in the extending portion.

4. The bearing structure according to claim 3, wherein any one or both of a radially protruding raised portion and a radially depressed portion is formed on a surface of the circumferential groove.

5. The bearing structure according to claim 4, wherein the depressed portion is an annular groove having a diameter smaller than that of the surface of the circumferential groove.

6. The bearing structure according to claim 1, wherein a circumferential groove extending in a circumferential direction of the main body portion and having an outer diameter smaller than that of the damper surface is formed in the extending portion.

7. A turbocharger comprising the bearing structure according to claim 1.

* * * * *